US009309922B2

(12) United States Patent
Delepine et al.

(10) Patent No.: US 9,309,922 B2
(45) Date of Patent: Apr. 12, 2016

(54) SET OF ROLLING BEARINGS AND CORRESPONDING ROTARY MACHINE

(71) Applicant: GE ENERGY POWER CONVERSION TECHNOLOGY LIMITED, Warwickshire, Warwickshire (GB)

(72) Inventors: Xavier Delepine, Ville en Vermois (FR); Yves Lacour, Nancy (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 0 days.

(21) Appl. No.: 14/378,585

(22) PCT Filed: Feb. 7, 2013

(86) PCT No.: PCT/EP2013/052396
§ 371 (c)(1),
(2) Date: Aug. 13, 2014

(87) PCT Pub. No.: WO2013/120755
PCT Pub. Date: Aug. 22, 2013

(65) Prior Publication Data
US 2015/0003769 A1    Jan. 1, 2015

(30) Foreign Application Priority Data
Feb. 13, 2012 (FR) ...................................... 12 51308

(51) Int. Cl.
*F16C 19/18* (2006.01)
*F16C 19/54* (2006.01)
(Continued)

(52) U.S. Cl.
CPC .............. *F16C 19/542* (2013.01); *F16C 27/04* (2013.01); *F16C 32/0442* (2013.01);
(Continued)

(58) Field of Classification Search
CPC ........ F16C 25/083; F16C 27/066; F16C 39/02; F16C 32/04
See application file for complete search history.

(56) References Cited

U.S. PATENT DOCUMENTS 5,977,677 A * 11/1999 Henry .................... F01D 25/164
310/90
6,727,616 B1 * 4/2004 Gabrys ............... F16C 32/0402
310/90

(Continued)

FOREIGN PATENT DOCUMENTS

| CN | 1544821 A | 11/2004 |
|---|---|---|
| EP | 0499310 | 8/1992 |
| JP | 2011001972 | 1/2011 |

OTHER PUBLICATIONS

International Search Report dated Sep. 4, 2013 which was issued in connection with PCT Patent Application No. PCT/EP2013/052396 which was filed on Feb. 7, 2013.

(Continued)

*Primary Examiner* — Thomas R. Hannon
(74) *Attorney, Agent, or Firm* — GE Global Patent Operation; Catherine J. Toppin

(57) ABSTRACT

This set of roller bearings, which is a grounding bearing for a rotary machine, comprises a first-angular contact rolling bearing having a first outer race, a first inner race and first rolling elements, a second angular-contact rolling bearing having a second outer race, a second inner race and second rolling elements, a mount in which the first angular-contact rolling bearing and the second angular-contact rolling bearing are mounted. The first outer race and the second outer race are arranged in the mount either directly one beside the other or via the interposition of an intermediate member, the axial stiffness of which is greater than that of the mount and than those of the first and second outer races. Application for example to asynchronous motors.

20 Claims, 2 Drawing Sheets

(51) Int. Cl.
*F16C 39/02* (2006.01)
*F16C 27/04* (2006.01)
*F16C 32/04* (2006.01)
*F16C 35/07* (2006.01)
*F16C 41/00* (2006.01)
*F16C 35/073* (2006.01)
*F16C 35/06* (2006.01)

(52) U.S. Cl.
CPC .............. *F16C 35/07* (2013.01); *F16C 35/073* (2013.01); *F16C 39/02* (2013.01); *F16C 41/004* (2013.01); *F16C 35/061* (2013.01)

(56) References Cited

U.S. PATENT DOCUMENTS

2004/0189124 A1   9/2004   Baudelocque et al.
2011/0085753 A1   4/2011   Tecza

OTHER PUBLICATIONS

Unofficial English translation of Chinese Office Action issued in connection with corresponding CN Application No. 201380009173.3 on Dec. 30, 2015.

* cited by examiner

SET OF ROLLING BEARINGS AND CORRESPONDING ROTARY MACHINE

FIELD OF THE INVENTION

Embodiments of the present invention relate to a set of roller bearing unit consisting of a bearing block for a rotating machine.

BACKGROUND OF THE INVENTION

The following types of bearing sets are known to the art. These sets are, for example, mounted within an asynchronous motor, the rotor of which is housed within the main bearings, which are magnetic.

The bearing sets form secondary bearings, also termed gear chassis, which support the shaft in the event the primary bearing malfunctions.

The bearing sets known to the state of the art comprise an element that mounts the two external bushings axially within the chassis, which exerts an axial preload on the external bushings, and which is relatively flexible.

Moreover, the two external bushings are arranged within the chassis so that there is an end-play between them.

A damping element is positioned immediately around the two exterior bushings.

The bearings are ceramic bearing elements.

The bearing set known to the art have the following drawbacks.

When the bearing set undergoes radial stress by the rotor shaft, the coaxial positioning of the two bearings is not ensured, due to the axial end-play between the two external bushings, which in turn is owing to the fact that the external bushings are in direct contact with the damping element, and because of the relatively weak axial preload.

The damping element cannot dampen the shaft's radial displacement without damping the radial displacement of the bearings with respect to the other one within the housing. The angular deviation of the shaft, or the displacement of the shaft around an axis perpendicular to its rotational axis, displaces the bearings with respect to one another.

Thus the concentric arrangement of the bushings is not ensured.

Since the bearings are angular contact bearings, radial stress is translated into a reactive axial force, which acts against the preload force. The preload, therefore, cannot be defined in this case.

Embodiments of the present invention intend to ameliorate these defects and proposes a bearing set that allows dependable functioning when used as a secondary bearing.

BRIEF DESCRIPTION OF THE INVENTION

Embodiments of the present invention propose a set of the type indicated, characterised in that the primary external bushing and the secondary external bushing are positioned within the housing, one immediately beside the other; with an intermediate element positioned between them, in particular one single intermediate element, the radial rigidity of which is greater than that of the chassis, and that of the primary and secondary bushings.

According to some embodiments, the set comprises one or several of the following characteristics: The primary external bushing is in contact with the secondary external bushing; The primary internal bushing is in contact with the secondary internal bushing; The primary and secondary external bushings each contain a bearing track, defined by one partial semi-cylindrical track and one semi-toroidal track; The set comprises means of axial tightening, which tighten the primary and secondary external bushings toward the chassis, with the axial stiffness of the means of tightening under an axial force applied by the secondary external bushing less than or equal to the stiffness of the two external bushings under this axial force; The means of axial tightening comprise means of fastening and a circular plate, and the axial stiffness of the means of fastening is lower than the axial stiffness of the two external bushings and the circular plate by a factor of 10 or more; A damper positioned around the chassis, which damper has a radial stiffness lower than that of the primary and secondary angular contact bearings; The damper is a corrugated sheet, of sheet metal, with the corrugations arranged circumferentially or axially; A housing, with the chassis positioned within the housing, where the chassis is in contact with the housing, and, if necessary, the damper is in contact with the chassis and the housing.

Embodiments of the present invention also propose an electric motor consisting of a rotor shaft, a primary bearing, namely a magnetic bearing, and a set of rolling bearings, characterised in that the set of bearings is as described above, where the bearing set forms a secondary bearing, with the secondary bearing supporting the rotor shaft when the primary bearing fails, and in that the rotor is mounted on the primary bearing making no contact with the secondary bearing.

BRIEF DESCRIPTION OF THE DRAWINGS

The invention will be better understood upon reading the following description, provided solely as example, referring to the attached drawings, of which.

DETAILED DESCRIPTION OF THE INVENTION

Figure 1:
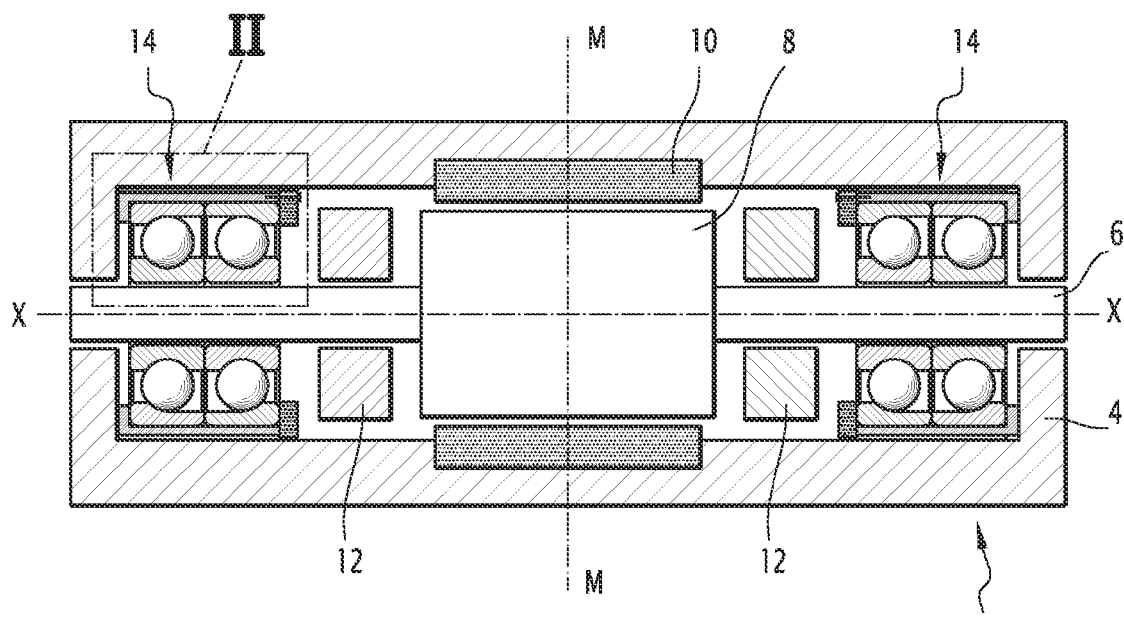
FIG. 1 is an axial cross-section of a motor according to an embodiment of the invention.

FIG. 1 shows an electric motor according to an embodiment of the present invention, designated by the general reference 2.

The electric motor 2 is an example of an asynchronous motor. The motor 2 is an example of a motor with a nominal speed greater than 6,000 RPM. The nominal speed is more particularly greater than 8,000 RPM.

The electric motor 2 comprises a housing 4 or shell, a shaft 6, a rotor 8, and a stator 10.

The electric motor 2 defines a main axis X-X, which is the rotational axis of shaft 6 and rotor 8. In what follows, the expressions "axially", "radially", and "circumferentially" shall be used with respect to the main axis. The axes of the elements described below are deemed coaxial with the main axis, unless otherwise indicated. The motor 2 also defines a median plane M-M, extending perpendicularly to the main axis X-X. The median plane M-M is positioned at the centre of the axis of rotor 8.

The shaft 6 and rotor 8, taken together, have a mass that is greater than 500 kg, in particular greater than 750 kg.

The electric motor 2 also comprises two primary bearings 12 adapted to support shaft 6 whilst rotating, and thus also rotor 8. In this case the primary bearings 12 are magnetic bearings, more particularly with an actively supported drive shaft with two guide pins. The two primary bearings 12 are positioned axially on either side of rotor 8.

The electric motor 2 also comprises two sets of roller bearings 14.

Each roller bearing set 14 is a secondary or bearing block adapted to support the shaft 6 when the associated primary bearing 12 fails.

In the case represented, the two roller bearing sets 14 are identical and are arranged within the housing 4, symmetrically with respect to the medial plane M-M.

In a variant not represented here, the two roller bearing sets 14 are arranged symmetrically with respect to the medial plane M-M. Moreover, the roller bearings in a roller bearing set 14 may differ in size to the bearings in other roller bearing sets 14.

Figure 2:
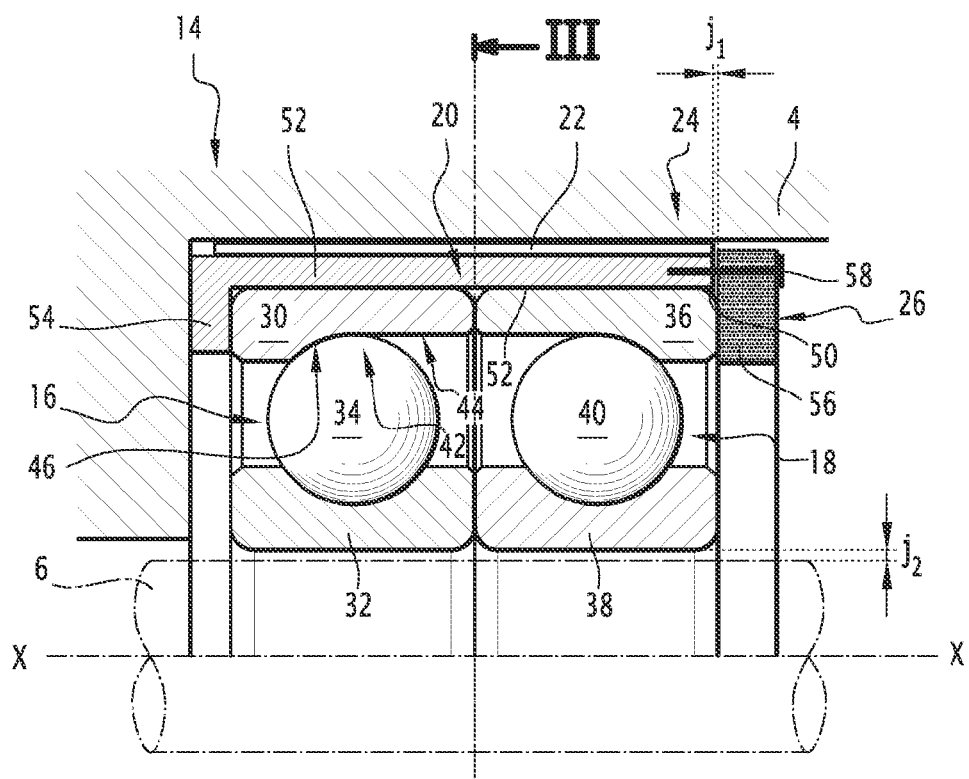
FIG. 2 is a larger-scaled view of detail II of FIG. 1.

In what follows, only one of the roller bearing sets 14 shall be described, making reference to FIG. 2.

The roller bearing set 14 consists of a primary angular contact bearing 16, a secondary angular contact bearing 18, a chassis 20, a damper 22, a portion 24 of housing 4, and means of axial tightening 26.

The two angular contact bearings 16 and 18 are mounted in an X-form.

The primary angular contact bearing 16 comprises a primary external bushing 30, a primary internal bushing 32, and primary rolling elements 34. In this instance the primary rolling elements 34 are balls. The primary rolling elements 34 are made of metal, notably steel, for example. As a variant, the primary rolling elements 34 are made of ceramic.

The secondary angular contact bearing 18 comprises a second external bushing 36, a second internal bushing 38, and secondary rolling elements 40. In this instance the primary rolling elements 40 are balls. The secondary rolling elements 40 are made of metal, notably steel, for example. As a variant, the secondary rolling elements 40 are made of ceramic.

In the present case, the primary external bushing 30 and the second external bushing 36 each comprise an external track 42 formed by a semi-cylindrical track 44 and a semi-toroidal track 46. In profile, the semi-cylindrical track 44 is continuous with the profile of the semi-toroidal track 46. Moreover, the two semi-cylindrical tracks 44 of the two external bushings 30 and 36 are adjacent. The two tracks 42 of the primary external bushing 30 and the secondary external bushing 36 are thus open axially on one side, so that lacking any external check, the external bushings 30 and 36 can be axially removed from the associated rolling elements.

The primary internal bushing 32 and the secondary internal bushing 38 each comprise an internal track which is exclusively in the form of a semi-toroid and which is axially closed on both sides.

The primary external bushing 30 and the secondary external bushing 36 are arranged immediately side by side in the chassis. In the present case, the primary external bushing 30 and the secondary external bushing 36 are in contact with one another.

More particularly, the primary angular contact bearing 16 and the secondary angular contact bearing 18 are identical. The only difference is their symmetrical positioning with respect to one another.

The chassis 20 comprises an opening 50 for receiving rolling elements. The chassis 20 is formed by a cylindrical wall 52 and a circular base wall 54. Thus, the opening 50 is formed by the interior surface of the cylindrical wall 52 and by the interior surface of the base wall 54, The primary external bushing 30 is in contact with the base wall 54 and with the cylindrical wall 52, whilst the secondary external bushing 36 is in contact with the cylindrical wall 52, but not with the base wall 54.

The primary internal bushing 32 is in direct contact with the secondary internal bushing 38.

The primary angular contact bearing 16 and the secondary angular contact bearing 18 are mounted within the chassis 20. The means of axial tightening 26 are adapted to tighten the primary and secondary external bushing 30 and 36 axially against the chassis 20, more precisely toward the base wall 54.

The axial stiffness of the means of tightening 26, under an axial force applied by the secondary external bushing 36, is equal to or less than the stiffness of the two external bushings 30 and 36 under this same force. In other words the means of axial tightening 26 have more axial deformation than the two external bushings 30 and 36.

The axial stiffness of the means of tightening 26 is significantly lower than the stiffness of the two external bushings (by a factor of 10 or more).

The axial stiffness of the means of tightening is very significant. For example, the axial stiffness is greater than the axial stiffness of current systems that use a flexible strip.

Tightening serves to put the external bushing 30 and 36 in contact, which before tightening have an initial gap of at least 1/100 mm, and more particularly several hundredths of a mm. The initial gap is an item in the construction specifications of the bearing manufacturer.

The means of axial tightening 26 are, for example, made up of a circular plate 56 and means of fastening 58 that fasten the circular plate 56 to the chassis 20.

The means of fastening 58 are, for example, by bolts.

The axial stiffness of the means of fastening 58 is lower than the axial stiffness of the set of external bushings 30 and 36, and of the circular plate 56. Thus, under axial strain applied by the external bushing 36 on the circular plate 56, it is the means of fastening 58 that absorb the forces. Under such axial strain, the means of fastening 58 deform axially more than the circular plate 56.

During thermal expansion of the rolling elements 16 and 18, in particular, the means of fastening 58 grant a certain degree of axial play to bushings 30 and 36.

In a variant not represented here, the means of fastening 58 are a weld, such that plate 56 is welded to chassis 20.

In another variant not represented here, the circular plate 56 has an external diameter that corresponds to the interior diameter of cylindrical wall 52, where circular plate 56 has a threading that aligns with a bore set in cylindrical wall 52.

Moreover, one or more axial springs, such as a conical spring washer or helical springs, may be positioned between circular plate 56 and external bushing 36.

In this case, each axial spring may be housed within an axial cavity that is set in the circular plate 56, and which is open to the external bushing 36.

When the means of fastening 58, in its tightened state, pushes the circular plate 56 toward or against the external bushing 56, an axial clearance $j_1$ exists between the circular plate 56 and the chassis 20. This axial clearance $j_1$ is not a null value.

Figure 3:
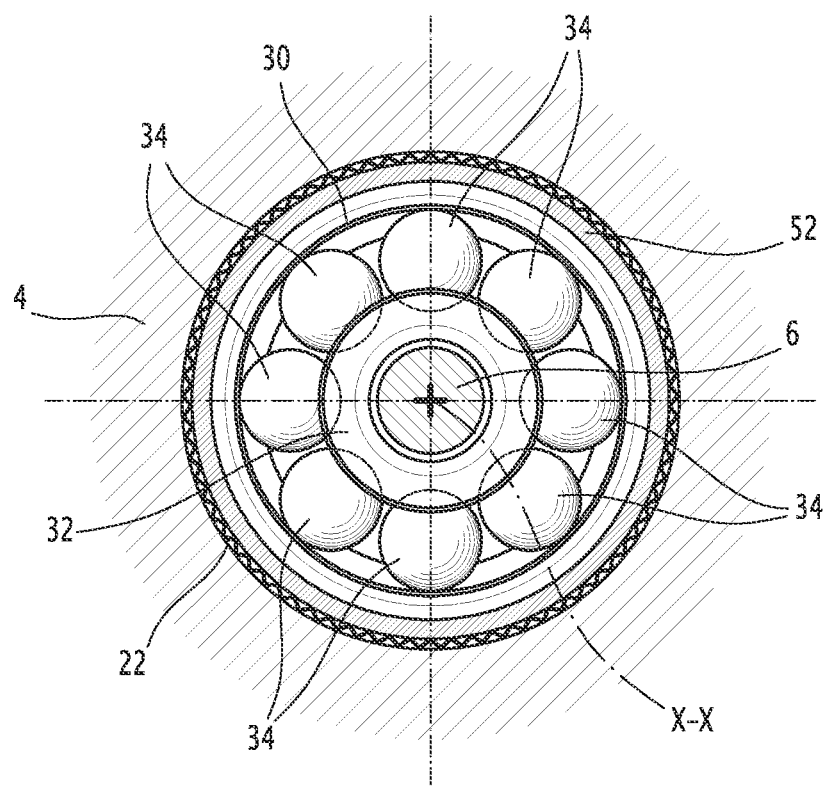
FIG. 3 is an axial cross-section along the line III-III in FIG. 2.

The damper 22 is positioned around chassis 20. The damper 22 has a radial stiffness that is less than the radial stiffness of the angular contact bearings 16 and 18. In this instance the damper 22 is a corrugated sheet. The corrugations extend circumferentially, as is visible in FIG. 3.

In a variant not represented, the corrugations extend axially.

The corrugated sheet is manufactured from sheet metal, for example.

The damper 22 is in direct contact with the chassis 20 and with the housing 4.

Alternatively, the damper 22, is omitted and the chassis 20 is in direct contact with housing 4.

In a variant not represented here, the primary external bushing 30 and the secondary external bushing 36 are arranged immediately side by side in the chassis 20. In this case, the primary external bushing 30 and the secondary external bushing 36 are positioned within the chassis 20 by interposition of an intermediate element, for example an intermediate ring. The intermediate element is in contact with the external bushings 30 and 36. The intermediate element has an axial stiffness that is greater than that of the means of fastening 58 and greater than that of the chassis, particularly that of the base wall 54. The axial rigidity of this intermediate element is also greater than that of the primary and secondary external bushings 30 and 36.

The electric motor 2 works in the following manner.

When shaft 6 is mounted on the main bearings, and when the main bearings 12 support shaft 6, shaft 6 and the primary and secondary internal bushings 32 and 38 define an end-play $j_2$. Shaft 6 does not contact the bearing sets 14, and thus does not contact the internal bushings 32 and 38.

When one or both main bearings 12 fail, particularly whilst the rotor 8 is turning, the shaft 6 comes into contact with the internal bushings 32 and 38 of the associated bearing set. The rotor 8 and shaft 6 are thenceforth borne by the bearing elements 16 and 18.

Thanks to the side-by-side positioning of the primary external bushing 30 and secondary external bushing 36, the distribution of axial and radial forces applied to the rolling elements is lessened when they come into contact with shaft 6. Moreover, the fact that the angular contact bearings 16 and 18 are mounted directly on the chassis ensures that axial alignment of the two rolling elements 16 and 18 is maintained. The angular deviation of chassis 20 around an axis perpendicular to the X-X axis produces a defined angular deviation of the two rolling elements 16 and 18.

Moreover, positioning the damper 22 around the chassis 20 allows for easy assembly of the two rolling elements on the chassis.

Direct application of the primary external bushing 30 and of the secondary bushing 36 on the wall 52 greatly facilitates assembly.

Positioning of the damper 22 around the chassis 20 also contributes to easy assembly, and guarantees that the primary angular contact bearing 16 and the secondary angular contact bearing 18 remain coaxial when contact is made with shaft 6.

Embodiments of the present invention can also generally apply to rotating machines, for example rotating electrical machines such as generators or motors. One variant of a rotating machine could be a compressor.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A roller bearing set consisting of a bearing block for a rotating machine, the roller bearing set comprising:

a primary angular contact bearing with a primary external bushing, a primary internal bushing, and primary rolling elements;

a secondary angular contact bearing with a secondary external bushing, a secondary internal bushing, and secondary rolling elements; and a chassis, wherein the primary angular contact bearing and the secondary angular contact bearing are mounted on the chassis, wherein the primary external bushing and the secondary external bushing are positioned within the chassis, one immediately adjacent to the other.

2. The roller bearing set according to claim 1, wherein the primary internal bushing is in contact with the secondary internal bushing.

3. The roller bearing set according to claim 1, further comprising a housing, wherein the chassis is positioned within the housing, and the chassis is in contact with the housing, or a damper is in contact with the chassis and the housing.

4. The roller bearing set according to claim 1, further comprising a damper positioned around the chassis, wherein the radial stiffness of the damper is lower than the radial stiffness of the primary angular contact bearing and the secondary angular contact bearing.

5. The roller bearing set according to claim 4, wherein the damper is a corrugated sheet, wherein the corrugations of the corrugated sheet are circumferential or axial.

6. The roller bearing set according to claim 4, wherein the damper is a corrugated metal sheet, and the corrugations of the corrugated metal sheet are circumferential or axial.

7. The roller bearing set according to claim 1, wherein each of the primary external bushing and the secondary external bushing comprises a track defined by a semi-cylindrical track and a semi-toroid track.

8. The roller bearing set according to claim 7, further comprising an axial tightener configured to tighten the primary external bushing and the secondary external bushing axially toward the chassis, with the axial stiffness of the axial tightener under an axial force applied by the secondary external bushing less than or equal to the stiffness of the primary external bushing and the secondary external bushing under the axial force.

9. The roller bearing set according to claim 7, further comprising a damper positioned around the chassis, wherein the radial stiffness of the damper is lower than the radial stiffness of the primary angular contact bearing and the secondary angular contact bearing.

10. The roller bearing set according to claim 1, wherein the primary external bushing is in contact with the secondary external bushing.

11. The roller bearing set according to claim 10, wherein each of the primary external bushing and the secondary external bushing comprises a track defined by a semi-cylindrical track and a semi-toroid track.

12. The roller bearing set according to claim 10, wherein the primary internal bushing is in contact with the secondary internal bushing.

13. The roller bearing set according to claim 12, wherein each of the primary external bushing and the secondary external bushing comprises a track defined by a semi-cylindrical track and a semi-toroid track.

14. The roller bearing set according to claim 13, further comprising an axial tightener configured to tighten the primary external bushing and the secondary external bushing axially toward the chassis, with the axial stiffness of the axial tightener under an axial force applied by the secondary external bushing less than or equal to the stiffness of the primary external bushing and the secondary external bushing under the axial force.

15. The roller bearing set according to claim 14, further comprising a damper positioned around the chassis, wherein the radial stiffness of the damper is lower than the radial stiffness of the primary angular contact bearing and the secondary angular contact bearing.

16. The roller bearing set according to claim 1, further comprising an axial tightener configured to tighten the primary external bushing and the secondary external bushing axially toward the chassis, with the axial stiffness of the axial tightener under an axial force applied by the secondary external bushing less than or equal to the stiffness of the primary external bushing and the secondary external bushing under the axial force.

17. The roller bearing set according to claim 16, further comprising a damper positioned around the chassis, wherein the radial stiffness of the damper is lower than the radial stiffness of the primary angular contact bearing and the secondary angular contact bearing.

18. The roller bearing set according to claim 16, wherein the axial tightener comprises a fastener and a circular plate, and the axial stiffness of the fastener is lower than the axial stiffness of the primary external bushing, the secondary external bushing, and the circular plate by a factor of 10 or above.

19. The roller bearing set according to claim 18, further comprising a damper positioned around the chassis, wherein the radial stiffness of the damper is lower than the radial stiffness of the primary angular contact bearing and the secondary angular contact bearing.

20. An electric motor, comprising:
a rotor shaft;
a primary bearing comprising a magnetic bearing;
a rolling bearing set comprising:
    a primary angular contact bearing with a primary external bushing, a primary internal bushing, and primary rolling elements;
    a secondary angular contact bearing with a secondary external bushing, a secondary internal bushing, and secondary rolling elements; and
    a chassis, wherein the primary angular contact bearing and the secondary angular contact bearing are mounted on the chassis,
    wherein the primary external bushing and the secondary external bushing are positioned within the chassis, one immediately adjacent to the other; and
    a secondary bearing supporting the rotor shaft when the primary bearing fails, wherein the rotor is mounted on the primary bearing making no contact with the secondary bearing.

* * * * *